United States Patent
Coulibaly et al.

(10) Patent No.: US 7,082,983 B2
(45) Date of Patent: Aug. 1, 2006

(54) PRE-ASSEMBLED WINDOW SHADE UNIT

(75) Inventors: Abdoul Coulibaly, Esslingen (DE); Bouaziz Belibel, Freigericht (DE); Christoph Binder, Esslingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/331,720

(22) Filed: Dec. 27, 2002

(65) Prior Publication Data

US 2003/0131953 A1 Jul. 17, 2003

(30) Foreign Application Priority Data

Jan. 17, 2002 (DE) ............................ 102 01 786

(51) Int. Cl.
*E06B 9/56* (2006.01)

(52) U.S. Cl. .................................. 160/306; 160/323.1
(58) Field of Classification Search ........... 160/370.22, 160/315, 323.1, 301, 306, 191, 192; 296/37.16, 296/97.8

See application file for complete search history.

(56) References Cited

U.S. PATENT DOCUMENTS

| 1,937,209 | A | * | 11/1933 | Traut ........................... 160/315 |
| 4,222,601 | A | | 9/1980 | White et al. |
| 4,228,843 | A | * | 10/1980 | Kobayashi ................... 160/315 |
| 4,674,550 | A | | 6/1987 | Graves |
| 4,762,358 | A | | 8/1988 | Levosky et al. |
| 5,676,415 | A | * | 10/1997 | Ament et al. ............. 160/323.1 |

FOREIGN PATENT DOCUMENTS

| DE | 29 41 711 A1 | 4/1980 |
| DE | 298 21 879 U1 | 3/1999 |
| DE | 199 03 811 C1 | 5/2000 |
| EP | 0 701 039 A1 | 9/1994 |

* cited by examiner

*Primary Examiner*—David Purol
(74) *Attorney, Agent, or Firm*—Leydig, Voit & Mayer, Ltd.

(57) ABSTRACT

A window shade component group which includes a window shade supporting windup shaft with bearing devices for rotatably supporting opposite ends of the windup shaft. At least one of the bearing devices is provided with a blocking device, which is effective for maintaining a spring drive of the windup shaft in the wound position after assembly of the windup shaft. Following installation of the window shade component group in a motor vehicle or appropriate housing, the blocking device is releasable as an incident to actuation of the windup shaft.

26 Claims, 5 Drawing Sheets

PRE-ASSEMBLED WINDOW SHADE UNIT

FIELD OF THE INVENTION

The present invention relates generally to window shade assemblies, and more particularly, to window shade assemblies adapted for installation into motor vehicles.

BACKGROUND OF THE INVENTION

It often is desirable for motor vehicles to have retractable window shades. If there is sufficient space for window shades in motor vehicles, the window shade can be pre-assembled as a component complete with housing or installation frame. The entire unit is installed as a whole at the assembly line.

Such assembly procedures prevail, for example, in connection with rear window shades. However, conditions are different if the window shade is to be housed in doors or behind the side paneling of motor vehicles. Often, space at such locations is not sufficiently large to enable installation of a completely pre-assembled unit. In such case it is necessary to fasten bearing devices for the windup shaft directly on appropriate elements on the motor vehicle body and then later insert the windup shaft with the window shade fastened thereon. However, a difficulty arises in that the window shade, even if it is electrically operated, is customarily retracted with the aid of a spring drive housed in the windup shaft. In order for the spring drive to properly perform its function, it must be appropriately wound so that sufficient winding force is available, even when the window shade web is in a completely wound up condition.

Properly winding of the spring drive at the assembly line also is difficult, particularly because an exact predetermined number of turns for winding is required. If the pre-tension is set too high, the spring drive reaches the limit before the window shade web is completely extended and blocks further extension. But if the spring is insufficiently wound, pre-tension of the window shade web when wound up is insufficient to assure that it is housed without rattling.

OBJECTS AND SUMMARY OF THE INVENTION

It is an object of the invention to provide a window shade component group which can be pre-assembled prior to installation into the motor vehicle, with the spring drive properly pre-wound.

In carrying out the invention, the pre-assembled window shade component group has a wind up shaft with a window shade web fastened at one edge to the wind up shaft. A spring drive is located in the interior of the windup shaft for pre-tensioning the windup shaft in the direction of winding of the window shade web. One end of the spring drive is fastened on the windup shaft and the other end of the spring drive is fixed in place on at least one bearing element or device provided at one end of the windup shaft for seating the latter in the vehicle or a housing.

A device for blocking the rotation of the winding shaft, which can be selectively released without use of a tool, is designed such that it can be brought into a blocking state when the window shade component group is pre-assembled. The blocking device is effective between the winding shaft and the bearing device for blocking the spring drive in a position corresponding to the window shade web being wound up on the windup shaft. The device for blocking the rotation can be permanently converted into an unblocking position or state, again without use of a tool, after the window shade component has been installed.

The invention encompasses various different embodiments:

In a first embodiment, a pivotable ratchet, for example, is provided on the bearing device which cooperates with a locking recess or pocket on the windup shaft. The ratchet is pre-tensed in the unblocking direction and is maintained in the recess or the pocket by the action and force of the spring drive. The ratchet can be released from the pocket by turning the windup shaft in the unwinding direction, and thereafter remains in the unblocked position because of the pretension.

An alternative embodiment provides a locking member, which also acts together with a pocket in the winding shaft and is rigidly connected with a bearing pin. In the pre-assembled position, the blocking member blocks the rotation of the windup shaft in relation to the bearing device on which the pin is provided. In the course of installation, the bearing pin is displaced in the axial direction so that it frees the windup shaft for rotation.

A further alternative embodiment involves providing a breakable blocking member rigidly on the bearing device. The blocking member has a predetermined breaking point which is torn or broken open in the course of the first actuation, thereafter permitting the windup shaft to be freely movable. The predetermined breaking point is made of such a dimension that it cannot be damaged by the spring drive while, on the other hand, the predetermined breaking point is sufficiently weak to prevent damage to the window shade web when the window shade web is pulled for breaking the blocking member.

It is understood that in all three of the above embodiments the blocking member, or the ratchet, could be provided on the windup shaft, while the pocket is rigidly seated in the bearing device.

It is practical in each case to design the device for blocking the rotation in such a way that no unsecured elements, which tend to rattle, remain when the unblocking condition has been achieved. In the case of the breakable blocking member, this can be achieved with the blocking member being is seated in a corresponding receiving pocket by means of an adhesive or press fit. With the other variations, keeping the components free from rattling is an inherent result.

Assembly at the destination is simplified if the device for blocking the rotation has a first blocking means, which is captively seated, as well as a captively seated second blocking means, which are designed to work together to effect blocking. Further simplification is achieved if one of the blocking means is movable, while the other is rigid.

The desired permanent unblocking condition is achieved if the movable blocking means is pre-tensioned in the unblocking position. When using a breakable blocking member or blocking means, both blocking means are basically immovable. After tearing or breaking open the predetermined breaking point, the element remaining on the windup shaft also is rigid and immovable with respect to the windup shaft.

To separate the blocking means from each other, or to bring them into an unblocking position, it is possible to make the arrangement such that movement parallel to the longitudinal axis of the windup shaft is required. Alternatively, the blocking means may be designed for radial movement with respect to the axis of the windup shaft.

The window shade components also may differ in their winding directions. For example, in connection with window shade arrangements on a side door, it is desired to house the mechanical elements as closely as possible to the hinge of the door. Such arrangement minimizes forces acting on the mechanical windup element when the door is pulled shut. The farther the elements are located away from the axis of rotation of the hinge, the greater the acceleration forces. To take this into account, it is advantageous that the device for blocking rotation be symmetrical in the sense that it is effective for both winding directions of the windup shaft without requiring special adaptations.

Other objects and advantages of the invention will become apparent upon reading the following detailed description and upon reference to the drawings, in which:

Figure 1:
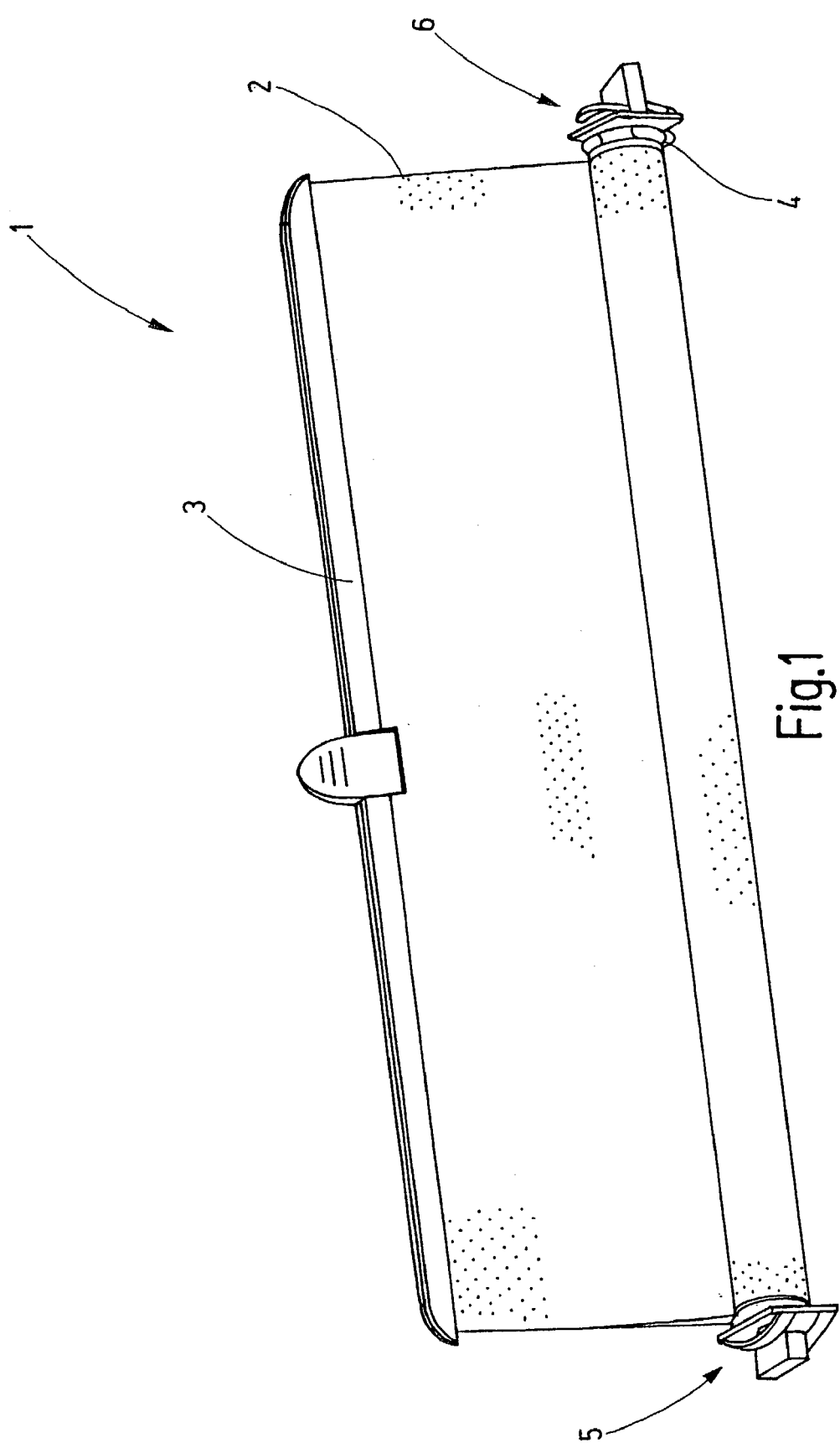
FIG. 1 is a perspective of a window shade component group in accordance with the invention, adaptable for installation in a motor vehicle.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIG. 1 of the drawings, there is shown an illustrative window shade component group 1 in accordance with the invention which is adaptable for installation into a motor vehicle. It will be understood that the window shade component group 1 can be installed as a window shade for a side window, a rear window, or a cargo space cover. The illustrated window shade component group 1 includes a window shade web 2 have a traction or pull-out rod 3 at a free end thereof, a wind-up shaft 4, and bearing elements 5, 6 for supporting the window shade within the motor vehicle. The window shade 2 is fastened on the windup shaft 4 along its edge remote from the pullout rod 3.

Figure 2:
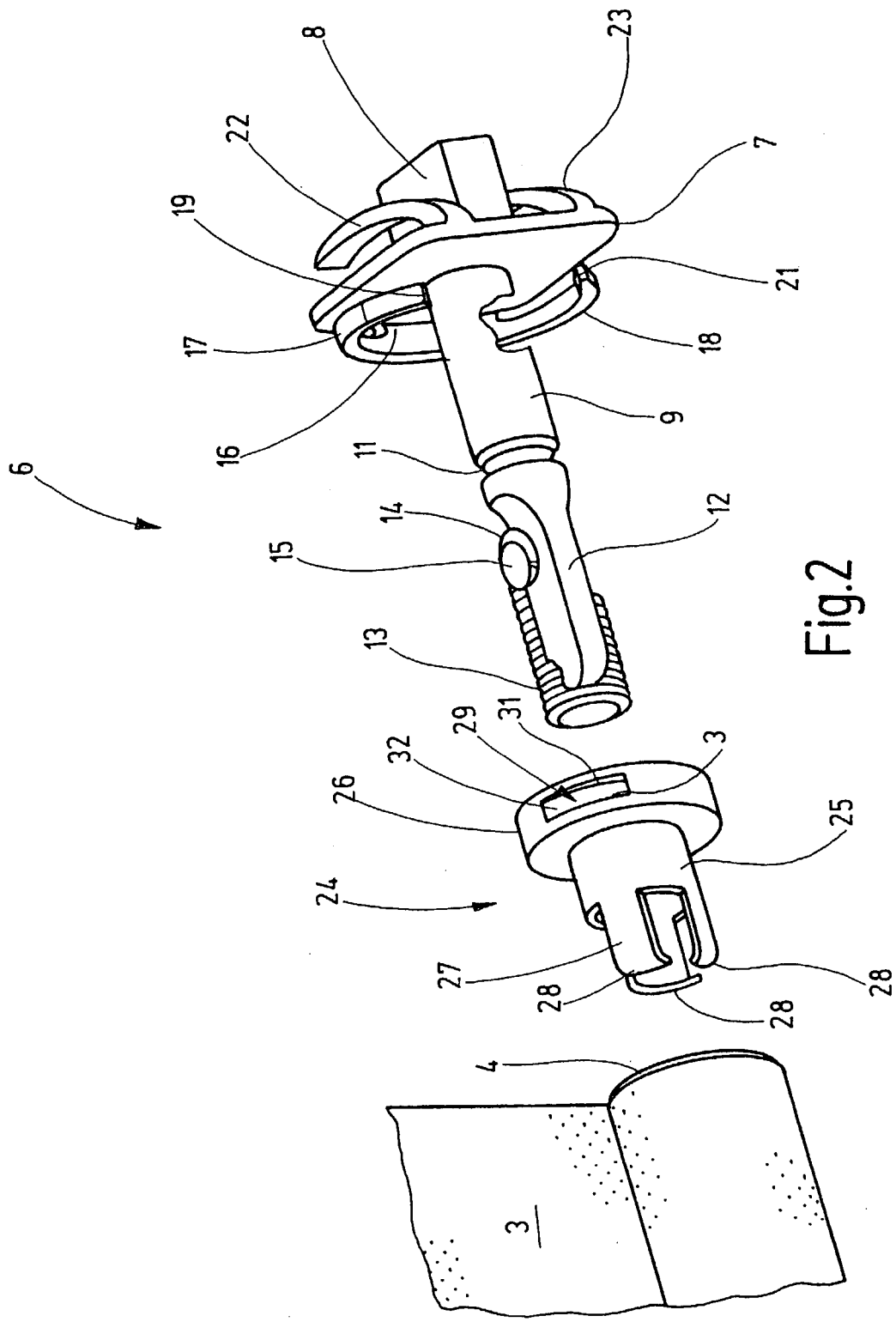
FIG. 2 is an exploded perspective showing the bearing device windup shaft and spring drive of the illustrated window shade component group.

The bearing element 6, as depicted in FIG. 2, has a flange plate 7, which extends radially with respect to the axis of the windup shaft 4 and supports a square pin 8 on its side facing away from the windup shaft 4. The square pin 8 is intended for being inserted into a corresponding square recess or square opening provided on a part of the vehicle. With the aid of the square pin 8, when the bearing element 6 is mounted, it is fixed against relative rotation.

On the side facing the windup shaft 4, the flange plate 7 supports a substantially cylindrical bearing pin 9 coaxial with respect to the square pin 8. At a distance away from the flange plate 7, the bearing pin 9 has a detent groove 11. In its further extension, the bearing pin 9 has a receiving pin 12 for a helical spring 13, which is fastened by means of a loop 14 on a rivet 15 fixed to the receiving pin 12. The rivet 15 is seated in the receiving pin 12 and serves as an anchoring point for the spring loop 14.

The other end of the helical spring 13 is fixed in the windup shaft 4 against relative rotation in a known manner so that the helical spring 13 is effective as a spring drive for pre-tensing the windup shaft 4 in the wind-up direction of the window shade web 2. A short strip 16 projecting in the direction toward the windup shaft 4 is located on the flange plate 7 on the same side as the bearing pin 9. The strip 16 makes a transition into two detent ratchets 17, 18 at an axial distance from the flange plate 7, which are curved in an arc shape for a distance around the circumference of the cylindrical bearing pin 9 at an approximately constant radial distance. The detent ratchet 17 terminates at a detent lug 19, and the detent ratchet 18 terminates at a detent lug 21. The two detent lugs 19, 21 are at a distance from each other which is determined by their function, as will be understood in the later explanation of their functioning.

Finally, the flange plate 7 also has two leaf springs 22, 23 on the side facing the square pin 8 which are intended to exert a predetermined axial pretension on the component group 1 in the assembled state in order to maintain it rattle-free between the flange plates 7. The bearing element 6 preferably is an injection-molded part made from a suitable thermoplastic or duroplastic material.

A bearing bush 24 is inserted into the windup shaft 4 on the end of the windup shaft 4 supported by the bearing element 6. The bearing bush 24 consists of a tube-shaped extension 25 which fits into the windup shaft 4 and which has a collar 26 on the end projecting out of the windup shaft 4. On the side remote from the collar 26, the tube-shaped portion of the bearing bush 24 defines three equally spaced leaf springs 27 extending in the axial direction, which each have a detent lug 28 on the free end. The three detent lugs 28 are designed for locking engagement in the detent groove 11 of the bearing pin 11. In the locked position, an outer front face of the collar 26 rests against the adjoining flat side of the flange plate 7. The bearing bush 24 is fastened in a suitable manner, fixed against relative rotation, in the tube-shaped windup shaft. For example, the bearing bush 24 may be glued in the windup shaft.

Figure 3:
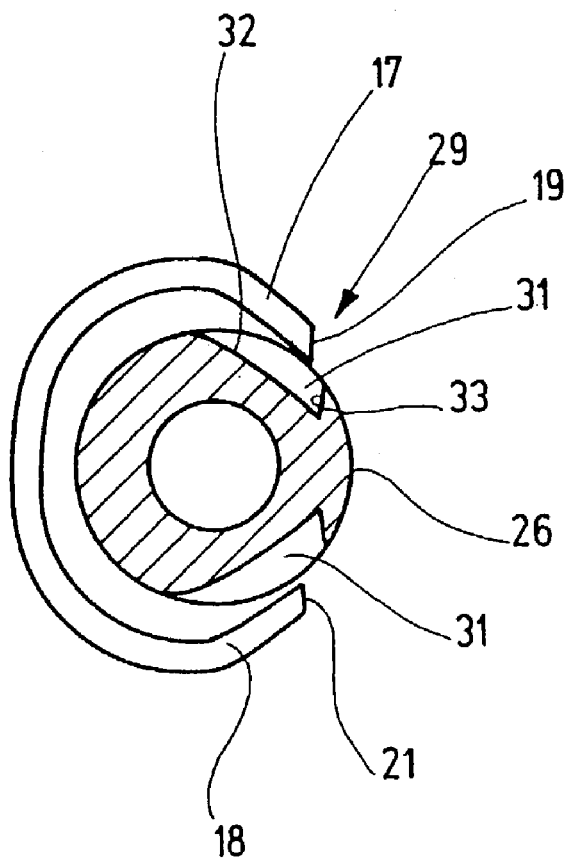
FIGS. 3 and 4 are transverse sections, schematically showing different engagement positions between movable and immovable blocking members of the illustrated window shade component group.
Figure 4:
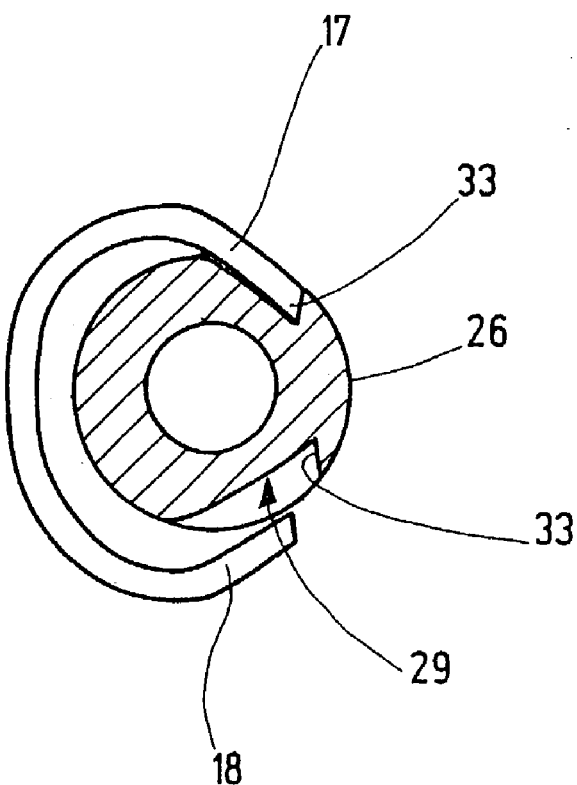

Two detent pockets 29, arranged in reversed relation to each other, are located in the cylindrical outer circumferential surface of the collar 26. Only one of these two detent pockets 29 can be seen in FIG. 4. The other detent pocket 29 is of the same design, but is oriented in the opposite direction, as indicated in FIGS. 3 and 4.

Each detent pocket 29 is bordered by a parallel lateral wall 31, as well as a bottom wall 32. Viewed in the circumferential direction, the bottom wall 32 changes its radial distance from the axis of rotation of the bearing bush 24. It starts at the cylindrical outer circumferential surface and terminates at a front face 33, which is radially inclined so that, as viewed from the outside, an undercut results.

The bearing element 5 on the other side of the windup shaft is substantially similar to the bearing element 6. Optionally the ratchets 17, 18 in the bearing element 5 may be omitted. The helical spring 13 constituting the spring drive is omitted in the bearing element 5 in any case. Similarly, a bearing bush 24 is provided.

The mode of functioning of the window shade and its bearing elements is as follows:

The window shade component group 1 is connected with the tube-shaped windup shaft 4 along an edge of the window shade web 2 by the manufacturer. The window shade web 2 is wound on the windup shaft. Thereafter, the bearing element 5, on which a bearing bush 24 has previously been placed, is inserted from the appropriate side of the windup shaft. The bearing bush is fixed within the interior of the windup shaft 4, such as by gluing, in order to prevent it from rotating relative to the windup shaft 4. When the window shade is used, the bearing bush will turn on the bearing pin 11 of the bearing element 5.

First, the bearing bush 24 is pushed on the bearing pin 9 at the other end of the windup shaft 4 until the detent lugs 28 engage the detent groove 11. Thereafter the spring loop 14 of the helical spring 13 is fastened on the pin 15. The other end of the helical spring 13 is provided with a suitable abutment or anchoring element which, for example, can be interlockingly displaced, but fixed against relative rotation, in a corresponding longitudinal groove in the interior of the windup shaft 4.

After having been prepared in this way, the component group comprising the bearing bush 24, the helical spring 13 and the bearing element 6, is inserted into the appropriate end of the windup shaft 4. The bearing bush 24 is mounted, fixed against relative rotation, in the windup shaft 4. This can also take place by gluing, or for example, also by means of fastening pins.

The window shade component group 1 now ready for assembly, except the spring drive has not yet been wound. For winding the spring drive, the bearing element 5 is turned in the appropriate direction of rotation in respect to the windup shaft 4. The number of turns corresponds to the desired pretension of the spring drive when the window shade web 2 has been wound. After attaining the desired wound-up position, the appropriate detent ratchet 17 or 18 is pushed radially inward into the associated pocket 29 for retaining the bearing bush and windup shaft in the tensioned condition.

By means of the force of the wound helical spring 13, the front face 33 of the respective pocket 29 will rest with a corresponding force on the front face 19 or 21 of the respective selected detent ratchet 17 or 18. In the contact position, the front end 19 or 21 extends parallel in relation to the front face 33, as seen in FIG. 4. Since, as previously indicated, the front end is oriented in such a way that a sort of undercut results, as viewed from the outside, a force is generated by means of the torque, together with the obliquely extending front face 33, which tends to pull or force the detent ratchet 17 or 18 into the associated pocket 29. Therefore the respective detent ratchet 17 or 18 will maintain its locked-in state, even if no further force acts from the outside on the respective detent ratchet 17 or 18 in order to bend it radially inward.

The windup shaft 4, as depicted in FIG. 2, rotates in a clockwise direction, looking from the front end of the windup shaft 4 in a direction from the square pin 8, when the window shade web 2 is wound on the shaft. This means that the detent ratchet 17 is appropriate for blocking the rotation in the windup direction. Together with the pocket 29, it will block such rotation.

The detent ratchet 18 with the associated, complementarily oriented pocket 29 would be provided for a direction of rotation for winding up the window shade web in the opposite direction. It could therefore be used, with the window shade not otherwise changed, in the area of the bearing element 5. That bearing element also is designed similarly to the element depicted in FIG. 2. The window shade component group 1 is now pre-assembled and the spring 13 wound in the desired way. The window shade component group 1 then can be delivered to the assembly line and installed there. Following its installation, the window shade web may be unwound a little from the windup shaft 4 by pulling on the traction bar 3. Because of the bending pre-tension in the detent ratchet 17, the latter is released from the receiving pocket 29 and thereupon remains in its relaxed position. In the relaxed position the front end 19 of the detent ratchet 17 is at a radial distance from the bearing pin 9 which is slightly greater than the outer diameter of the collar 26. The windup shaft 4, therefore, is freely rotatable without restriction from the detent ratchet 17.

In the exemplary embodiment in accordance with FIGS. 2 to 4 radial locking is provided by means of a detent ratchet lying in circumferentially with respect to the collar. An axial orientation alternatively can be provided in place of the radial orientation, depicted in FIG. 5. To the extent that already described components are repeated, they are provided with the same reference numeral as before, without a renewed description.

Figure 5:
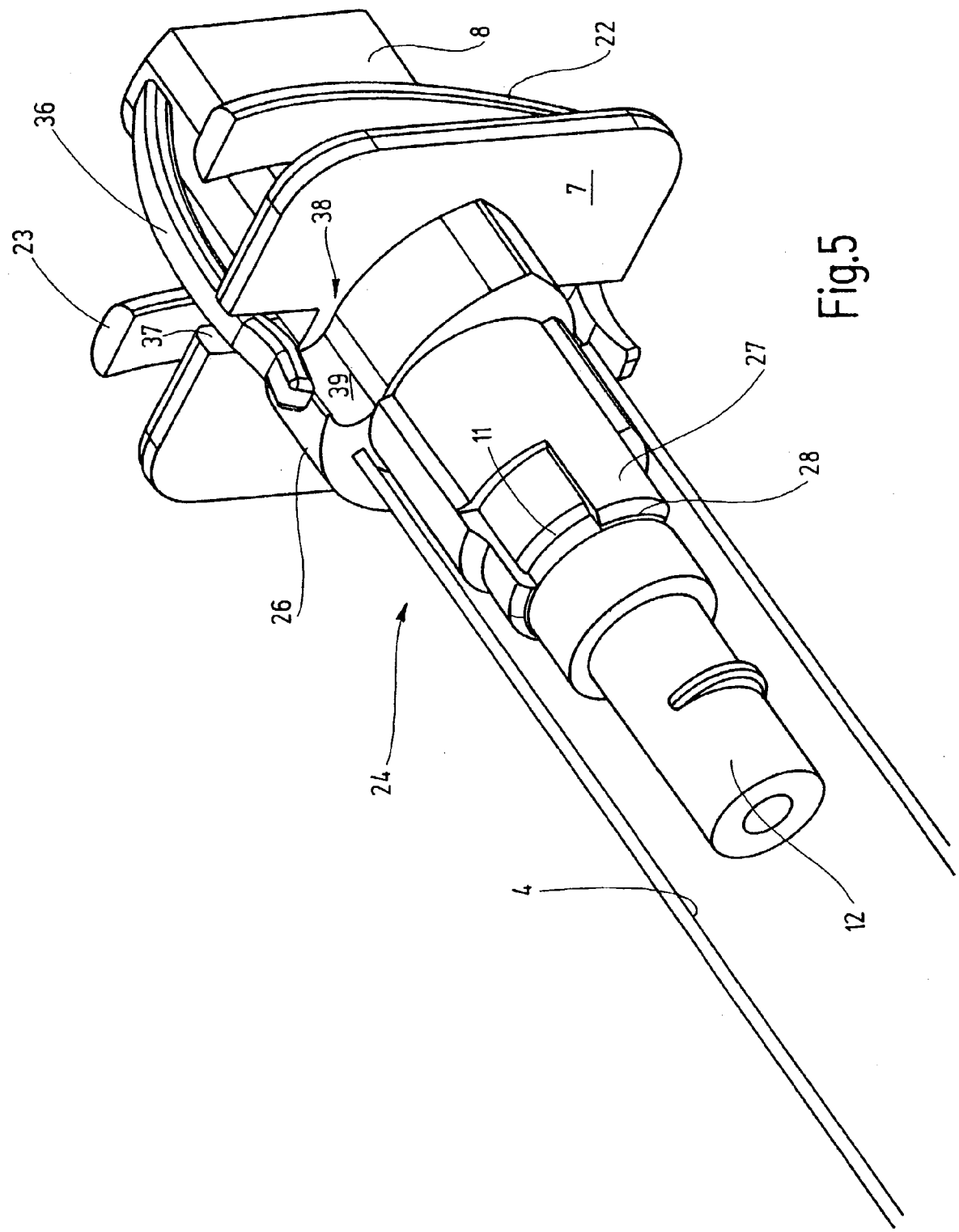
FIG. 5 is a perspective of an alternative embodiment of bearing device for a window shade component group, such as shown in FIG. 1, with a radial unblocking device.

In the arrangement in accordance with FIG. 5, a detent ratchet 36 in the form of a leaf spring that extends from the flat side of the square pin 8 and projects through a recess 37 at the edge of the flange plate in a direction toward the collar 26 of the bearing bush 24. The collar 26 contains two cutouts, of which only the cutout 38 can be seen. The latter terminates in a wall 39 which is curved in a concave, groove shape, as seen from the recess 38. It again forms a sort of an undercut. The cutout 38 extends over the entire width of the collar 26 so that it assumes the shape of a cam in the area between the two cutouts. The two cutouts 38 are oppositely oriented, i.e. the wall 39 is concave in the opposite direction from the functionally corresponding wall of the other cutout.

At the time of assembly, after the arrangement is finished and the square pin 8 has been turned to wind the helical spring 13 for achieving the desired wound-up position, the leaf spring 36 is pushed radially inward until it rests on the bottom of the cutout 38. After releasing the square pin 8, the latter turns corresponding to the winding direction of the windup shaft 4, and the free end of the leaf spring 36 is pushed into the space formed by the concave wall 38 and is maintained captured there because of the concave shape. The leaf spring 36 cannot snap outward. To do this it is first necessary, as previously mentioned, to turn the windup shaft a little bit in the direction of unwinding. Because of this the free end of the leaf spring 36 comes free from the semicylindrical space formed by the wall 38 and can snap radially outward. In the relaxed position its free end is at a distance from the axis of rotation of the bearing bush 24, which prevents abutting engagement of the leaf spring 36 with portions of the collar.

Figure 6:
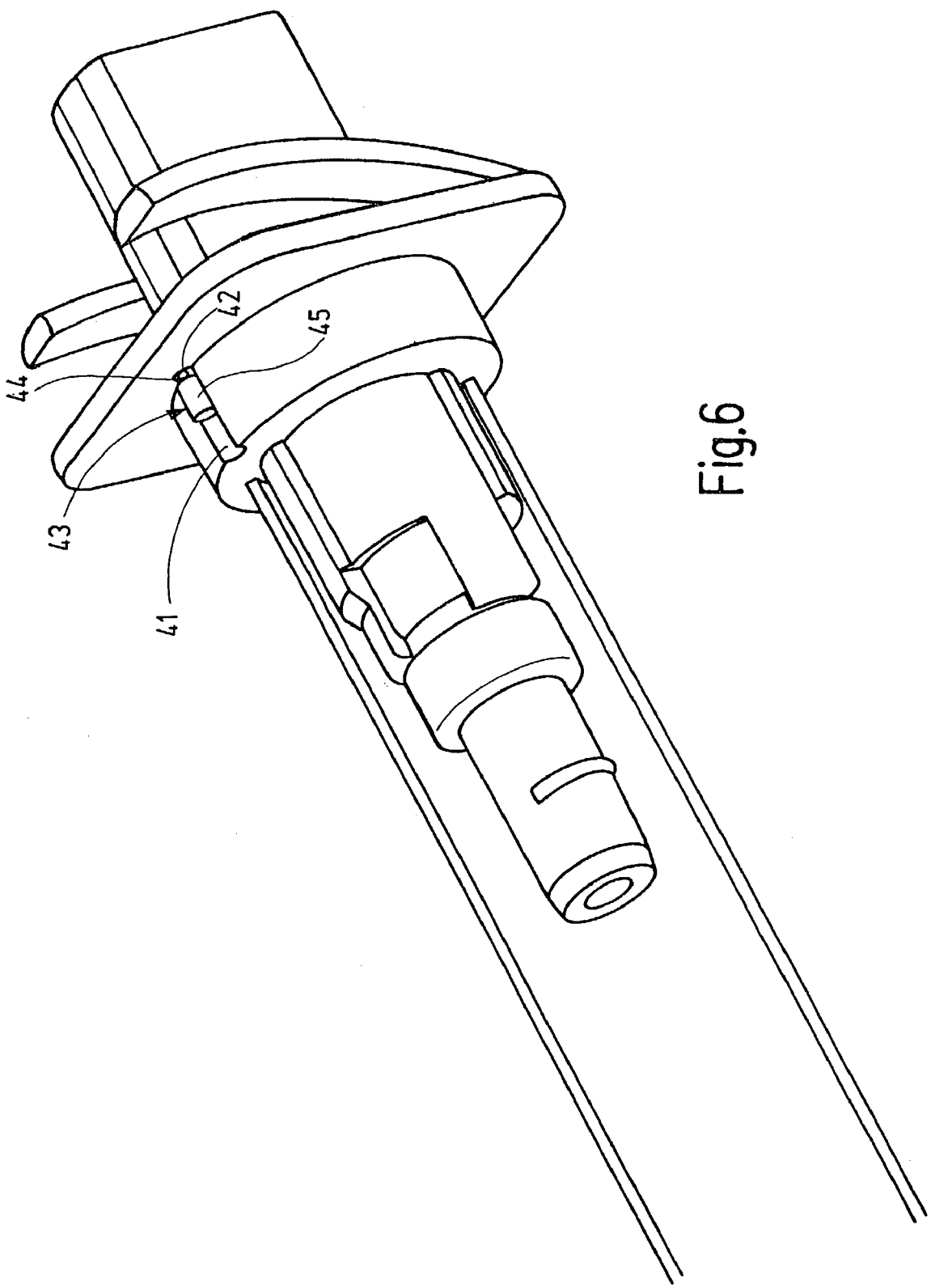
FIG. 6 is a perspective of a further alternative embodiment of bearing device for a window shade component group, such as shown in FIG. 1, with a break-off pin.

FIG. 6 shows still another alternative arrangement, wherein the blocking device is released by being broken. The collar of the bearing bush 24 in this case has an axially extending groove 41, while the flange plate is provided with a bore 42, which in the assembled state can be aligned flush with the groove 41. After the previously described assembly, a pin 43 is pushed through the bore 42 from the side facing the square pin 8, and this again takes place after the helical spring 13 has been wound. The pin 43 has a predetermined breaking point 44 located in the plane of the flange plate 7, while a pin section 45 located on the other side of the predetermined breaking point 44 comes to rest in the groove 41. In this way the pre-assembled window shade component group is maintained in the pre-tensed position. Following installation in the vehicle, the windup shaft 4 is turned with an appropriate force so that the pin section 45 is broken off. Thereafter the windup shaft 4 is freely rotatable.

Alternatively, for retaining the pin section 45 after breaking off, it is possible to use a bore in place of the groove 41, within which the pin section 45 remains due to friction. Hence, after the predetermined breaking point 44 has been broken, the pin section 45 is maintained in the bore by frictional contact.

From the foregoing, it can be seen that a window shade unit consisting of a windup shaft and at least one bearing device is provided with a blocking device, which is used for keeping the spring drive in the wound position after assembly. Following the installation of the window shade unit in the vehicle or the appropriate housing, the blocking device is releasable by actuating the windup shaft.

What is claimed is:

1. A window shade component group (1) comprising a windup shaft (4) with two ends,
   a window shade web (2) having one edge fastened to said windup shaft (4),
   a spring drive (12) for pre-tensioning the windup shaft (4) in a windup direction which winds the web onto the windup shaft, said spring drive (2) having two actuating ends (14) one of which is secured to the windup shaft (4),
   a bearing device (6, 24) disposed at one end of the windup shaft (4) and having a connecting end (8) for attachment to a vehicle, said spring drive having its other actuating end (14) fixed to said bearing device (6, 24),
   a releasable blocking device (17, 18, 29, 36, 38, 39, 43) having a blocking member set in an initial blocking condition for blocking the spring drive (12) from acting between the windup shaft (14) and the bearing device (6, 24) when the windup shaft is in a pre-tensioned condition corresponding to the window shade web (12) being wound up on the windup shaft, and said blocking member being releasable from said blocking condition without the need for tools to an unblocking condition solely in response to a first rotational movement of the windup shaft (4) in an unwinding direction of the window shade web (2) from the windup shaft for disabling the blocking device and enabling the spring drive (12) to act between said bearing device and windup shaft.

2. The window shade component group of claim 1 in which said blocking device (17, 18, 29, 36, 38, 39, 43) includes no elements which are disconnected from the blocking device as an incident to the blocking member being released to said unblocking condition.

3. The window shade component group of claim 1 in which said blocking device includes a first captively held blocking member (17, 18, 29, 36, 38, 39, 43) connected, fixed against relative rotation, with the windup shaft (4) and a second captively held blocking member connected, fixed against relative rotation, with the bearing device (6, 24).

4. The window shade component group of claim 3 in which one of said blocking members is movable, and the other blocking member is rigidly supported.

5. The window shade component group of claim 4 in which said movable blocking member (17, 18, 36) is pre-tensioned into an unblocking position.

6. The window shade component group of claim 3 in which said two blocking members are mutually engageable and held in such condition by means of pre-tension acting between the windup shaft (4) and the bearing device (6, 24).

7. The window shade component group of claim 3 in which the movable blocking member (17, 18, 36) is movable in a direction parallel to a longitudinal axis of the windup shaft (4).

8. The window shade component group of claim 3 in which the movable blocking member (17, 18, 36) is movable along an axis extending at a right angle to a longitudinal axis of the windup shaft.

9. The window shade component group of claim 1 in which the blocking device (17, 18, 29, 36, 38, 39, 43) includes blocking members (17, 18, 29, 36, 38, 39, 43) which act in opposite directions of rotation such that the blocking device can be used independently of the winding direction of the windup shaft (4) for winding the web onto the windup shaft.

10. The window shade component group of claim 3 in which one of said blocking members is movable, and one of said blocking members defines two blocking member receiving cutouts (29, 37) each of which is adapted for operatively engaging the movable blocking member (17, 18, 36).

11. The window shade component group of claim 4 in which the blocking device defines a plurality of seats for receiving the removable blocking member (17, 18, 36).

12. The window shade component group of claim 4 in which the movable blocking member (17, 18, 36) is a detent ratchet.

13. The window shade component group of claim 4 in which the rigid blocking member is formed with a movable blocking member receiving cutout (29, 37).

14. The window shade component group of claim 1 in which the blocking device can released to an unblocking condition as an incident to axial displacement of the bearing device (6, 24) relative to the windup shaft (4).

15. The window shade component group of claim 14 in which said blocking device includes a first captively held blocking member (17, 18, 29, 36, 38, 39, 43) connected, fixed against relative rotation, with the windup shaft (4) and a second captively held blocking member connected, fixed against relative rotation, with the bearing device (6, 24).

16. The window shade component group of claim 1 in which the blocking device is permanently maintained in an unblocking condition following selective release to such condition.

17. The window shade component group of claim 1 in which upon installation and release of the blocking device, the component group is functional as a motor vehicle window shade.

18. The window shade component group of claim 1 in which upon installation and release of the blocking device, the component group is functional as a motor vehicle cargo space cover.

19. The window shade component group of claim 1 in which the windup shaft is tube-shaped and said spring drive is housed within the windup shaft.

20. The window shade component group of claim 1 in which the spring drive comprises a helical spring (13).

21. The window shade component group of claim 1 in which the windup shaft (4) has a second bearing device (5) at its opposite end.

22. The window shade component group of claim 21 in which the windup shaft is freely rotatable on the second bearing device (5).

23. The window shade component group of claim 21 in which the second bearing device (5) is captively connected within the windup shaft (4).

24. The window shade component group of claim 21 in which the second bearing device (5) comprises a beating pin connected to the windup shaft (4).

25. A window shade component group (1) comprising a windup shaft (4) with two ends,
 a window shade web (2) having one edge fastened to said windup shaft (4),
 a spring drive (12) for pre-tensioning the windup shaft (4) in a windup direction which winds the web onto the windup shaft, said spring drive (2) having two actuating ends (14) one of which is secured to the windup shaft (4),
 a bearing device (6, 24) disposed at one end of the windup shaft (4) and having a connecting end (8) for attachment to a vehicle or housing, said spring drive having its other actuating end (14) fixed to said bearing device (6, 24),
 a blocking device (17, 18, 29, 36, 38, 39, 43) initially set in a blocking condition which blocks the spring drive (12) from acting between the windup shaft (14) and the bearing device (6, 24) when the windup shaft is in a pre-tensioned condition corresponding to the window shade web (12) being wound up on the windup shaft, said blocking device being releasable without the need for tools to an unblocking condition for disabling the blocking device and enabling the spring drive (12) to act between said bearing device and windup shaft, said blocking device including a first captively held blocking member (17, 18, 29, 36, 38, 39, 43) connected; to and fixed against relative rotation, with the windup shaft (4) and a second captively held blocking member connected, to and fixed against relative rotation, with the bearing device (6, 24), and one of said blocking members (42) being formed with a predetermined breaking point (44).

26. The window shade component group of claim 1 in which following release of said blocking member to said unblocking condition said blocking device cannot be reset in a blocking condition without disassembly of the window shade component group.

\* \* \* \* \*